US010828959B2

(12) United States Patent
Duan et al.

(10) Patent No.: US 10,828,959 B2
(45) Date of Patent: Nov. 10, 2020

(54) CONTROLLING IN-VEHICLE AIR QUALITY (71) Applicant: International Business Machines Corporation, Armonk, NY (US)

(72) Inventors: Ning Duan, Beijing (CN); Peng Gao, Beijing (CN); Jing Chang Huang, Shanghai (CN); Peng Ji, Nanjing (CN); Chun Yang Ma, Beijing (CN); Wei Sun, Beijing (CN); Zhi Hu Wang, Beijing (CN); Ren Jie Yao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/706,027

(22) Filed: Sep. 15, 2017

(65) Prior Publication Data
US 2019/0084369 A1    Mar. 21, 2019

(51) Int. Cl.
*B60H 1/00* (2006.01)
*B60H 3/00* (2006.01)

(52) U.S. Cl.
CPC ......... *B60H 1/008* (2013.01); *B60H 1/00771* (2013.01); *B60H 3/00* (2013.01); *B60H 1/00821* (2013.01)

(58) Field of Classification Search
None
See application file for complete search history.

(56) References Cited

U.S. PATENT DOCUMENTS

| 6,636,808 | B1 * | 10/2003 | Brown | B60H 1/00735 |
| | | | | 236/1 C |
| 7,050,897 | B2 * | 5/2006 | Breed | B60C 11/24 |
| | | | | 701/46 |

(Continued)

FOREIGN PATENT DOCUMENTS

| CA | 2736012 C | 8/2012 |
| CN | 106274381 A | 1/2017 |

OTHER PUBLICATIONS

Cornak et al., "Prediction of Vehicle Cabin Air Quality", Advances in Military Technology, vol. 7. No. 2, Dec. 2012, pp. 23-32, <http://aimt.unob.cz/articles/12_02/12_02%20(3).pdf>.

(Continued)

*Primary Examiner* — Avinash A Savani
*Assistant Examiner* — Martha M Becton
(74) *Attorney, Agent, or Firm* — Alexander G. Jochym (57) ABSTRACT

A method to train a machine learning model for in-vehicle air quality control in a knowledge-based system, executed by one or more computer processors, includes collecting data related to in-vehicle air quality from a plurality of probe cars where the data is collected by various on-board systems in each probe car. The method includes correlating the data related to in-vehicle air quality from each probe car with air quality measurements from each probe car, where the correlation is used to update the machine learning model. The method includes determining a situation when an in-vehicle air quality measurement of the air quality measurements is above a pre-determined in-vehicle air quality level and (Continued)

determining instructions for actions by one or more of the one or more on-board systems in each of the probe cars to maintain an in-vehicle air quality level at or below the pre-determined in-vehicle air quality level.

17 Claims, 5 Drawing Sheets

(56) References Cited

U.S. PATENT DOCUMENTS

| | | | | |
|---|---|---|---|---|
| 7,302,339 | B2* | 11/2007 | Gray | B60H 1/00771 340/436 |
| 8,576,069 | B2* | 11/2013 | Nadeem | B60H 3/00 340/539.25 |
| 9,783,024 | B2* | 10/2017 | Connell | G07C 5/008 |
| 10,011,156 | B2* | 7/2018 | Lee | B60H 1/00771 |
| 10,031,521 | B1* | 7/2018 | Newman | G01C 21/3691 |
| 10,232,680 | B2* | 3/2019 | Park | B60H 1/00849 |
| 10,315,492 | B2* | 6/2019 | Chelian | B60H 1/00771 |
| 10,427,496 | B2* | 10/2019 | Connell | B60H 1/00985 |
| 2004/0215382 | A1* | 10/2004 | Breed | B60C 11/24 701/45 |
| 2005/0021224 | A1* | 1/2005 | Gray | B60H 1/00771 701/36 |
| 2009/0326760 | A1 | 12/2009 | Clark et al. | |
| 2011/0095908 | A1* | 4/2011 | Nadeem | B60H 3/00 340/905 |
| 2011/0172880 | A1* | 7/2011 | Tamura | B60H 1/00735 701/36 |
| 2011/0184250 | A1* | 7/2011 | Schmidt | G06Q 10/00 600/300 |
| 2012/0293315 | A1* | 11/2012 | Schunder | G08G 1/096775 340/438 |
| 2015/0032266 | A1 | 1/2015 | Weast et al. | |
| 2015/0345958 | A1* | 12/2015 | Graham | G01C 21/343 701/22 |
| 2016/0280040 | A1* | 9/2016 | Connell | G07C 5/008 |
| 2016/0318368 | A1* | 11/2016 | Alger | B60H 1/00771 |
| 2017/0036511 | A1* | 2/2017 | Lee | B60H 1/00771 |
| 2017/0113512 | A1* | 4/2017 | Park | B60J 7/057 |
| 2018/0050575 | A1* | 2/2018 | Campbell | B60H 1/008 |
| 2018/0079278 | A1* | 3/2018 | Kirpichnikov | B60H 1/00742 |
| 2018/0203443 | A1* | 7/2018 | Newman | G01C 21/3691 |
| 2018/0326811 | A1* | 11/2018 | Chelian | B60H 1/00771 |

OTHER PUBLICATIONS

Galatsis et al., "Car Cabin Air Quality Sensors and Systems", Encyclopedia of Sensors, vol. X, Copyright 2006, pp. 1-11, <http://www.co-gas-expert.com/wp-content/uploads/2012/12/Encyclopedia_Chapter.pdf>.

Mikova, "2015 Volvo XC90 Unveils Improved Multi-filter that Enhances Interior Air Quality", Automobiles Review.com, Nov. 12, 2014, 6 pps., <http://www.automobilesreview.com/auto-news/2015-volvo-xc90-unveils-improved-multi-filter-that-enhances-interior-air-quality/93560/>.

YouTube, "2015 Volvo XC90 Interior Air Quality System—Clean Zone", Volvo, SafestCar, published on Apr. 7, 2015, 5 pps., <https://www.youtube.com/watch?v=z4aWvfFuUZw>.

YouTube, "Breathe cleaner air inside a Volvo than outside", Volvo, Volvo Car UK, published on Mar. 22, 2013, 5 pps., <https://www.youtube.com/watch?v=2F_hh1x0C9g>.

\* cited by examiner

CONTROLLING IN-VEHICLE AIR QUALITY

BACKGROUND OF THE INVENTION

The present invention relates generally to the field of data processing using a knowledge processing system and more particularly to a method of controlling automotive in-vehicle air quality.

The automotive industry is seeing a rapid increase in the integration of intelligent vehicle technologies. Advanced driver-assistance systems (ADAS) are one of the fastest-growing segments in automotive electronics. ADAS are systems developed to automate, adapt, and enhance vehicle systems to improve safety and to improve the driving experience by incorporating features such as automatic parking, lane departure warning systems, adaptive headlight control, and maintaining vehicle-to-vehicle distance when using cruise control. ADAS utilizes various inputs from various data sources including automotive image sensors, digital cameras, lidar, radar, global positioning systems (GPS), and can receive additional inputs from other vehicles or other roadside infrastructure resources using wireless or radio communication networks.

Increased utilization of wireless communication and radio communication to provide connectivity both between vehicles or vehicle-to-vehicle (V2V) communication and vehicle to infrastructure (V2X) communication allows real-time access to large amounts of data on traffic, construction, weather air quality, nearby vehicles, and points of interest that may utilized by a number of ADAS or knowledge-based systems in vehicles to improve driving safety and convenience.

SUMMARY

Embodiments of the present invention disclose a method, a computer program product, and a system for one or more computer processors to train a machine learning model for in-vehicle air quality control in a knowledge-based system. The method includes one or more computer processors collecting a plurality of data related to in-vehicle air quality from a plurality of probe cars wherein the plurality of data related to in-vehicle air quality is collected by one or more on-board systems in each probe car of the plurality of probe cars. The method includes one or more computer processors correlating the plurality of data related to in-vehicle air quality from each probe car of the plurality of probe cars with a plurality of air quality measurements from each probe car of the plurality of probe cars, wherein the correlation is used to update the machine learning model. Furthermore, the method includes one or more computer processors determining one or more situations when an in-vehicle air quality measurement of the plurality of air quality measurements is above a pre-determined in-vehicle air quality level and determining instructions for one or more actions by one or more of the one or more on-board systems in each of the plurality of probe cars to maintain an in-vehicle air quality level at or below the pre-determined in-vehicle air quality level.

DETAILED DESCRIPTION

Embodiments of the present invention recognize that air pollution in the environment is an increasing concern due to man-made pollutants from industrialization, increasing vehicle use, and construction that add to naturally occurring air pollution such as particulate matter from forest fires, seasonal pollen, volcanic ash, and the like. Embodiments of the present invention recognize that a reduction in air quality due to man-made pollutants and other naturally occurring sources affects in-vehicle air quality when exterior air enters a vehicle through a vehicle ventilation system or windows of a vehicle. Additionally, embodiments of the present invention recognize that out-gassing of volatile organic compounds in materials used in the interior of the vehicle for dashboards, control panels, seats, and the like adversely affects interior or in-vehicle air quality.

Embodiments of the present invention recognize that air quality systems using air quality sensors are provided in some vehicles. Embodiments of the present invention recognize that an air quality sensor in an air quality system measures air quality outside of a vehicle. Embodiments of the present invention recognize that the air quality system automatically closes outside air intake to the vehicle when the air quality sensor detects polluted or contaminated outside air the vehicle. Embodiments of the present invention recognize that use of an air quality sensor in a vehicle requires additional hardware and maintenance cost for a user of a vehicle. Embodiments of the present invention recognize that hardware such as an air quality sensor in a vehicle is limited to the measurement of the one or more pollutants based on initial construction of the air quality sensor. Embodiments of the present invention recognize that the measurement of additional pollutants requires an installation of additional air quality sensors at an additional cost to the user.

Embodiments of the present invention recognize that each air quality system includes a standard or an allowable level of outside air quality that is set in the factory during vehicle manufacture. Embodiments of the present invention recognize that an air quality system utilizing an air quality sensor in a vehicle does not provide an ability to change a factory set level of allowable level of outside air quality without a vehicle service visit to update the air quality system and/or to add new hardware such as a new air quality sensor in the vehicle. Embodiments of the present invention recognize that changes occur in an allowable level of air quality due to changing regulations, changing vehicle locations, or specific health needs of a user in a vehicle (e.g., a driver with very high pollen allergies or asthma triggered by specific chemicals, etc.). Embodiments of the present invention recognize that air quality systems are not capable of customization for individual user health needs or re-setting allowable level of outside air quality, according to new regulations, without additional vehicle service or new hardware for each vehicle. Embodiments of the present invention recognize a need to provide vehicle users an in-vehicle air quality control system that is customizable to new regulations, new vehicle locations, and specific, identified health needs of users in a vehicle without the additional cost and maintenance of an air quality sensor within or external to the vehicle.

Embodiments of the present invention provide a method, a program, and a system that automatically maintains an allowable air quality level that is at or below a pre-set in-vehicle air quality level in a vehicle without the use of an air quality sensor. Embodiments of the present invention utilize a program in a knowledge-based system for in-vehicle air quality control, trained using data related to in-vehicle air quality received from probe cars with various on-board vehicle systems and air quality sensors to maintain in-vehicle air quality.

Embodiments of the present invention provide training to a program in a knowledge-based system on a server to predict and maintain in-vehicle air quality based, at least in part, on received data related to in-vehicle air quality provided by various on-board systems in probe cars with in-vehicle air quality sensors. Embodiments of the present invention include training a program, which is an inference engine, in a knowledge-based system for in-vehicle air quality control by analyzing collected data on situations and factors affecting in-vehicle air quality received from various on-board systems and air quality sensors in a plurality of probe cars. Embodiments of the present invention provide training to a program for in-vehicle air quality control in a knowledge-based system on a server to maintain a pre-set level of in-vehicle air quality by determining actions for vehicle on-board systems such as heating, ventilation, and air conditioning systems or power windows based, at least in part, on received data related to in-vehicle air quality provided by various on-board systems in probe cars. Data related to in-vehicle air quality collected by on-board systems in probe cars includes data such as vehicle location data, weather, traffic conditions, nearby vehicles, in-vehicle air quality, type of area (e.g., rural, city, tunnel, etc.), and the like.

Embodiments of the present invention provide a program for in-vehicle air quality control in the knowledge-based system on a server that receives data related to in-vehicle air quality from a vehicle without an air quality sensor. Embodiments of the present invention provide a program for in-vehicle air quality control in the knowledge-based system on a server that determines and sends instructions for one or more actions such as open power windows, to one or more on-board systems in a vehicle without an air quality sensor to maintain a pre-set air quality level for in-vehicle air quality (e.g., maintain the in-vehicle air quality level at or below a pre-set or allowable air quality level). Embodiments of the present invention provide the program for in-vehicle air quality control in the knowledge-based system on a server based, at least in part, on training of the program in the knowledge-based system by analyzing data related to in-vehicle air quality collected from probe cars.

Embodiments of the present invention provide an ability to provide a pre-set in-vehicle air quality level that may be customizable to a user provided input. Embodiments of the present invention provide an ability to change a pre-set in-vehicle air quality level in a machine learning model for in-vehicle air quality control in a knowledge-based system for one or more vehicles based, at least in part, on a received user input on a user interface in a vehicle or on another computing device provided to the machine learning model or program for in-vehicle air quality control in a knowledge-based system.

Embodiments of the present invention provide a program for in-vehicle air quality control in a knowledge-based system that communicates a change in a pre-set in-vehicle air quality level simultaneously to one or more vehicles. Embodiments of the present invention provide a program in a knowledge-based system for in-vehicle air quality control on a server with an ability to communicate a change in a pre-set in-vehicle air quality level wirelessly to one or more vehicles without requiring each vehicle to visit a dealer or service center visit to change the pre-set air quality. Embodiments of the present invention provide a program for in-vehicle air quality control in a knowledge-based system receives from a user interface an indication of a need for a custom or special in-vehicle air quality level due to a special health requirement of a user or passenger in the vehicle such as, a high sensitivity to tree pollen, and adjusts or re-sets the pre-set in-vehicle air quality level for the user with special health requirements.

Embodiments of the present invention provide a capability to download to a plurality of vehicles without an air quality sensor a program for in-vehicle air quality control in a knowledge-based system or a knowledge-based system for in-vehicle air quality control. Embodiments of the present invention provide in a vehicle a program for in-vehicle air quality control downloaded from a knowledge-based system for in-vehicle air quality that is trained, at least in part, using data related to in-vehicle air quality received from various on-board systems and air quality sensors in a plurality of probe cars. Embodiments of the present invention provide the ability to maintain a pre-set level of in-vehicle air quality at or below the pre-set in-vehicle air quality level without the use of an in-vehicle air quality sensor based, at least in part, on the downloaded program for air quality control and data related to in-vehicle air quality collected by on-board systems in a vehicle without an air quality sensor. Embodiments of the present invention provide an ability to update or synchronize a program for in-vehicle air quality control in a plurality of vehicles without air quality sensors with a program for in-vehicle air quality control in a knowledge-based system for in-vehicle air quality control on a server.

Figure 1:
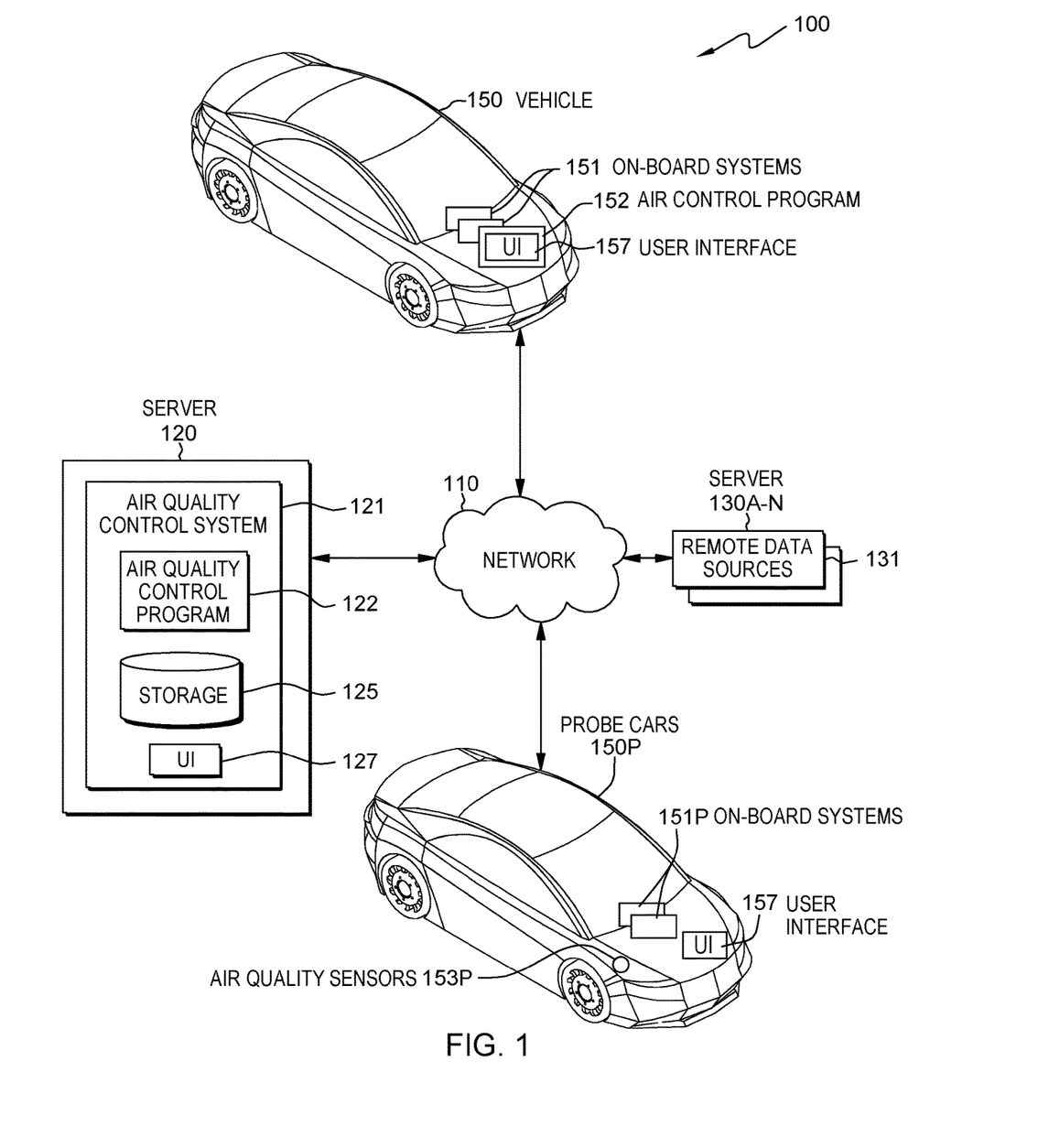
FIG. 1 is a functional block diagram illustrating a distributed data processing environment, in accordance with at least one embodiment of the present invention.

FIG. 1 is a functional block diagram illustrating a distributed data processing environment 100, in accordance with at least one embodiment of the present invention. FIG. 1 provides only an illustration of one implementation and does not imply any limitations, with regard to the environments, in which different embodiments may be implemented. Many modifications to the depicted environment may be made by those skilled in the art without departing from the scope of the invention as recited by the claims.

As depicted, distributed data processing environment 100 includes server 120, servers 130A-N, vehicle 150, and probe cars 150P interconnected over network 110. Network 110 can include, for example, a telecommunications network, a radio communication network, a local area network (LAN), a virtual LAN (VLAN), a wide area network (WAN), such as the Internet or a combination of these and can include wireless connections or wired connections. Network 110 can include one or more wireless networks or wired networks that are capable of receiving and transmitting data such as a global position system (GPS) location, an air quality level, or weather conditions, for example. In general, network 110 can be any combination of connections and protocols that will support communications between server 120, servers 130A-N, on-board systems 151, air control program 152 in vehicle 150, on-board systems 151P, air quality sensors 153P in probe cars 150P, and other computing devices (not shown) within distributed data processing environment 100.

Servers 120 and servers 130A-N may each be a server, a management server, a web server, a mainframe computer or any other electronic device or computing system capable of receiving, sending and processing data. In various embodiments, server 120 and servers 130A-N represent a computing system utilizing clustered computers and components (e.g., database server computers, application servers, etc.) that act as a single pool of seamless resources such as used in a cloud-computing environment when accessed within distributed data processing environment 100. In another embodiment, servers 120 and servers 130A-N can be a laptop computer, a tablet computer, a netbook computer, a notebook computer, a desktop computer, a mobile computing device such as a smart phone, or any programmable electronic device capable of communicating with on-board systems 151 in vehicle 150, on-board systems on probe cars (not depicted), air quality control system 121 on server 120 and air control program 152 in vehicle 150 via network 110. Servers 120A and servers 130A-N may include internal and external hardware components, as depicted and described in further detail with respect to FIG. 5.

As depicted in FIG. 1, server 120 includes air quality control system 121 with air quality control program 122, storage 125, and user interface (UI) 127. In various embodiments, server 120 receives data relating to in-vehicle air quality from air control program 152 in vehicle 150. In various embodiments, server 120 sends, receives, retrieves, and stores data relating to in-vehicle air quality from air control program 152 in multiple vehicles 150 and from on-board systems 151P in one or more probe cars 150P.

In various embodiments, data relating to in-vehicle air quality received by server 120 includes information and data on the external environment (e.g., weather, road type, points of interest, type of surrounding area, etc.) in the vicinity of vehicle 150 and probe cars 150P and data on the interior vehicle environment (e.g., interior vehicle temperature, power window status, air quality levels, etc.) in vehicle 150 and probe cars 150P. Data relating to or impacting in-vehicle air quality received from vehicle 150 (e.g., air control program 152) and/or on-board systems 151P in probe cars 150P collected by on-board systems 151 or 151P includes one or more of a vehicle location, vehicle location information (e.g., type of area such as rural, city, industrial, road type, tunnel, etc.), vehicle travel speed, nearby vehicles, traffic conditions, weather conditions in the vicinity of a vehicle (e.g., wind/rain), status of various on-board systems 151 or 151P such as power windows or HVAC system, one or more actions by on-board systems 151 and 151P, map information including nearby points of interest (e.g., oceans, factories, construction, tunnels, power plants, etc.), air quality in the vicinity of vehicle 150 or probe cars 150P, in-vehicle air quality measured by air quality sensors 153P in probe cars 150P, status of on-board systems 151 or 151P such as air-conditioning turned on with air re-circulation or windows closed, information retrieved from servers 130A-N hosting remote data sources 131 such as the National Oceanic and Atmospheric Administration (NOAA) providing current and historical air quality in vicinity of a vehicle, forest fires and/or weather conditions for an area or vehicle location, Department of Transportation providing road construction around a location, and the like. For the purposes of the present invention, data that is collected may be data that is retrieved or received by a system in a computing device or a program such as air quality control program 122 on server 120 or an on-board system in a vehicle.

Air quality control system 121 on server 120 includes air control program 122, storage 125, and UI 127. Air quality control system 121 is knowledge-based system or cognitive system that includes air quality control program 122, storage 125, and UI 127. Air quality control system 121 receives, sends, and stores information including vehicle 150 and/or probe car 150P location, air quality data from air quality sensors 153 in probe cars 150P, and instructions for one or more actions by on-board systems 151 and 151P relating to maintaining in-vehicle air quality in vehicle 150 and probe cars 150P.

In various embodiments, air quality control system 121 collects or receives data related to in-vehicle air quality from vehicle(s) 150 (e.g., from air control program 152) and from on-board systems 151P and air quality sensors 153P in probe cars 150P. In various embodiments, air quality control system 121 stores the collected data related to in-vehicle air quality (e.g., collected from air control program 152, on-board systems 151P and air quality sensors 153P in probe cars 150P) in storage 125.

Air quality control program 122 on server 120 is a machine learning model that is one of a program, an application, or a module. In various embodiments, air quality control program 122 is a machine learning model that is a program used as an inference engine in a knowledge-based system (i.e., in air quality control system 121) that maintains a pre-set in-vehicle air quality level at or below the pre-set in-vehicle air quality level. Air quality control program 122 collects and analyzes data related to in-vehicle air quality to determine if one or more actions by one or more of on-board systems 151 or on-board systems 151P are needed to keep an in-vehicle air quality level at or below a pre-set level of in-vehicle air quality. In an embodiment, a pre-set in-vehicle air quality in air quality control program 122 is a user specified level of in-vehicle air quality (e.g., for a specific user health requirement such as an allergy) at or below the pre-set level of in-vehicle air quality. In various embodiments, air quality control program 122 collects data related to in-vehicle air quality (e.g., data from on-board systems 151P, air quality sensors 153P in probe cars 150P, and data from air control program 152 in vehicle 150) and receives an indication of user-initiated actions related to in-vehicle air quality by one or more on-board systems 151 or 151P. In one embodiment, air quality control program 122 retrieves on a pre-set interval (e.g., every hour) data related to in-vehicle air quality and one or more actions by on-board systems 151P from on-board systems 151P in probe cars 150P. In various embodiments, air quality control program 122 sends data related to in-vehicle air quality to storage 125. In one embodiment, air quality control program 122 collects data from remote data sources 131. In an embodiment, air quality control program 122 retrieves and analyzes data related to in-vehicle air quality retrieved from databases in storage 125.

Air quality control program 122 in a knowledge-based system (e.g., air quality control system 121) is trained to determine instructions for one or more actions to maintain a pre-set in-vehicle quality level using data related to in-vehicle air quality collected by on-board systems 151P and air quality sensors 153P in probe cars 150P. During training, air quality control program 122 learns actions such as close windows or increase airflow in a ventilation system to be performed by one or more on-board systems 151P to maintain a pre-set in-vehicle vehicle air quality that is equal to or better than the pre-set in-vehicle air quality level in response to various factors and conditions (e.g., following a large truck). During training, air quality control program 122 determines instructions for one or more actions by on-board systems 151P and/or 151 based at least in part, on an analysis of data related to in-vehicle air quality provided by one or more on-board systems 151P in probe cars 150P and a pre-set in-vehicle air quality level.

In some embodiments, air quality control program 122, once trained, receives data related to in-vehicle air quality such as location, road type, nearby vehicles, nearby factories or power plants, and the like from air control program 152 in vehicle 150, and in response, provides to air control program 152 in vehicle 150 instructions for actions by one or more on-board systems 151 in vehicle 150 to maintain in-vehicle air quality to a pre-set air quality level that is equal to or better than the pre-set in-vehicle air quality level (e.g., keeps an in-vehicle TVOC level at or below the pre-set in-vehicle air quality level for TVOC).

In some embodiments, a trained air quality control program 122 in air quality control system 121 receives data related to in-vehicle air quality from air control program 152 and determines instructions for one or more actions by on-board systems 151 in vehicle 150 without air quality sensors to maintain a pre-set in-vehicle air quality level.

In various embodiments, air quality control program 122, once trained, is downloaded to vehicle 150 as air control program 152, based on a received user input on UI 127 or another UI of a computing device (not depicted). In various embodiments, air quality control program 122, once trained and downloaded to vehicle 150 as air control program 152, provides the capability to maintain in-vehicle air quality levels to a pre-set or target level in-vehicle air quality level without the use of in-vehicle air quality sensors (e.g., using data related to in-vehicle air quality received from on-board systems 151). In an embodiment, air quality control program 122 continues to receive data related to in-vehicle air quality from a plurality of probe cars 150P (e.g., from probe car on-board systems 151P) after completion of training and in response, air quality control program 122 continues to learn and evolve program updates for one or more new instructions for actions for probe car on-board systems 151P to improve the ability to maintaining in-vehicle air quality in vehicle 150 (e.g., based on additional probe car 150P data related to in-vehicle air quality). In one embodiment, air control program 152 receives updates from air quality control program 122 on a pre-determined interval (e.g., every week). In an embodiment, air quality control program 122 on server 120 sends program updates to air control program 152 in vehicle 150 whenever a change in air quality control program 122 occurs (e.g., a change to instructions for actions by on-board systems 151 or 151P in response to due to additional probe car data).

In various embodiments, air quality control program 122 receives from a user via UI 127, UI 157, or another UI (not depicted) information or data on allowable air quality levels such as total volatile organic compounds (TVOC), particulate matter (e.g., PM 2.5 or PM 10), air quality index (AQI), specific elements (pollen, $CO_2$, or the like). The received user input allowable air quality level can be set as a pre-set or pre-determined in-vehicle air quality level. Based on the information provided in the user input, the pre-set in-vehicle air quality level is applicable to one or more vehicles (e.g., one or more vehicle 150 or probe cars 150P). In an embodiment, air quality control system 121 retrieves or receives allowable levels of TVOC, particulate matter, specific elements, or the like from a regulatory database such as the environmental protection agency (EPA). In various embodiments, the pre-set or target level of allowable in-vehicle air quality may include but, is not limited to one or more of a pre-set allowable level of particulate matter, TVOCs, AQI, pollen, specific type of pollen or another element (e.g., sulfur, methane, etc.). In an embodiment, air quality control program 122 receives from UI 157 a user specified level of in-vehicle air quality that replaces or becomes the pre-set quality level for the vehicle (e.g., vehicle 150 or one of probe cars 150P in response to a user identified health requirement of a passenger or driver of vehicle 150).

Storage 125 as depicted in FIG. 1 resides in server 120. Storage 125 may include one or more databases. Storage 125 may receive and store data from air quality control program 122, UI 127, air control program 152, and on-board systems 151P and air quality sensors 153P in probe cars 150P. Storage 125 may store data related to in-vehicle air quality such as historical air quality data for vehicle locations or nearby location, in the vicinity of the vehicle, measured in-vehicle air quality levels by time and location, weather conditions, and the like. Storage 125 may store data related to in-vehicle air quality in one or more databases by time recorded, by location recorded, by source (e.g., vehicle 150), by a combination of identifiers (e.g., by location or city and date or season) for retrieval by air quality control program 122. Storage 125 may reside in one or more other computing devices or servers (not shown in FIG. 1).

Servers 130A-N are any number of servers hosting remote data sources 131 such as a website, application, or database for organizations, businesses, regulatory bodies, local weather services, NOAA, local air quality measurement stations transmitters, Department of Transportation, information sites or map information for cities, counties, states, and the like. Remote data sources 131 on servers 130A-N provide data related to in-vehicle air quality such as power plant and factory locations, areas of construction or heavy traffic, local air quality measurements, identification of rural areas, and the like retrieved from one or more databases, websites, or storage devices (e.g., local air quality measurements from NOAA). In various embodiments, remote data source 131 on servers 130A-N may be queried by air quality control program 122, probe car on-board systems 151P, on-board systems 151, and by air control program 152. In an embodiment, remote data sources 131 provide data to one or both of air quality control program 122 and air control program 152 on a pre-determined or pre-set interval (e.g., once a week, once a month, or every day).

Vehicle 150 is a motorized vehicle including a plurality of on-board systems 151, air control program 152, and UI 157. In FIG. 1, vehicle 150 is depicted as a single vehicle or car. In various embodiments, vehicle 150 is an example of one vehicle of many vehicles 150 with on-board systems 151, air control program 152, and UI 157. Vehicle 150 includes wheeled motorized vehicles such as cars, taxis, vans, trucks, buses, and the like. In an embodiment, vehicle 150 includes enclosed, driver-protected vehicles such as tractors, other farm equipment, boats, or construction equipment where air quality control program 122 uses data from similar probe driver protected vehicles (e.g., tractors in a pesticide application environment, construction equipment, boats, and the like) with interior air quality sensors capable collecting and transmitting data to server 120.

In various embodiments, each on-board system of on-board systems 151 is one of the following: an embedded system, one or more microcontrollers, one or more microprocessors, or other semiconductor device included in a device or system generally including hardware, mechanical or electrical parts. On-board systems 151 include but, are not limited to one or more of: HVAC systems, power windows, navigation system (e.g., includes location determination, associated map information, and vehicle 150 travel speed determination), and ADAS including surround view systems, crosswind stabilization systems, navigation systems, rain sensors, traction control, wireless communication systems (e.g., vehicle to vehicle communication systems, vehicle to infrastructure communication systems), and the like. In various embodiments, on-board systems 151 send and receive data from air control program 152, server 120, and servers 130A-N. In some embodiments, on-board systems 151 send and receive data related to in-vehicle air quality from other vehicles (e.g., to/from on-board systems 151 in other vehicles 150).

In various embodiments, air control program 152 contains programming codes and routines of air quality control program 122, downloaded from server 120 to a computing device or on-board system in vehicle 150 in response to a user input (e.g., on UI 127) after training air quality control program 122. In various embodiments, air control program 152 provides the instructions for actions by various on-board systems 151 in vehicle 150 (e.g., to open power windows, to stop re-circulating air in a HVAC system, etc.). In an embodiment, air control program 152 in vehicle 150 receives a user input custom air quality requirement (e.g., related to a specific health need of one or more vehicle users) on UI 157 and uses the received custom air quality requirement as the pre-set air quality level for vehicle 150.

In various embodiments, air control program 152 collects or retrieves data related to in-vehicle air quality from on-board systems 151. In an embodiment, air quality control program 152 retrieves data related to in-vehicle air quality from remote data sources 131 and/or other vehicles on-board systems (e.g., from other vehicles' on-board systems 151). In various embodiments, air control program 152 determines and sends instructions for one or more actions to on-board systems 151 such as HVAC system and power windows in order to maintain pre-set interior vehicle 150 air quality, based, at least in part, on the data related to in-vehicle air quality and a pre-set in-vehicle air quality level. The actions determined by air control program 152 may include, for example, maintaining current settings, turning-on air conditioning, or opening power windows.

In various embodiments, air control program 152 periodically retrieves from air quality control program 122 on server 120 updates to programming code and routines relating to maintaining a pre-set in-vehicle air quality level in vehicle 150 determined based, at least in part, on new or additional probe car data relating to in-vehicle air quality (e.g., probe car data collected for a new city or a new season). In various embodiments, air control program 152 retrieves or receives updates from air quality control program 122 communicated wirelessly on a pre-determined schedule such as every day, every week, every month, or the like.

In an alternative embodiment, air control program 152 is not downloaded from air quality control system 121 but is a program collecting data related to in-vehicle air quality from on-board systems 151 that sends the collected data related to in-vehicle air quality to air quality control program 122 on server 120. In response, air control program 152 receives from air quality control program 122, via network 110, instructions for one or more actions by one or more on-board systems 151 to maintain a pre-set level of in-vehicle air quality. For example, in response to receiving data from air control program 152 indicating a nearby dump truck, air quality control program 122 sends to air control program 152 in vehicle 150 instructions for power windows to close. In response to receiving instructions to close power windows, air control program 152 sends the instructions to vehicle 150 to a power window system for execution (e.g., power window system of on-board systems 151 closes windows).

In various embodiments, vehicle 150 includes UI 157. UI 157 receives user inputs and displays information to users (e.g., driver and passengers) of vehicle 150 and probe cars 150P. For example, UI 157 in vehicle 150 is any known user interface providing an interface between a user and air control program 152 in vehicle 150, and enables a driver or passenger of vehicle 150 to interact with programs and data in vehicle 150, servers 120, 130A-N, computing devices in other vehicles (e.g., in other vehicles 150 and probe cars 151P) along with other computing devices (not shown in FIG. 1). In one embodiment, UI 157 may be a graphical user interface (GUI), a web user interface (WUI), a touch screen, or a UI capable of receiving audio or verbal inputs. UI 157 can display text, maps, application interfaces, and instructions for operation, and include the information (such as graphic, text, and sound) that a program presents to a user and the control sequences the user employs to control the program.

Probe cars 150P are a plurality of motorized wheeled vehicles with a plurality of on-board systems 151P, air quality sensors 153P, and UI 157. On-board systems 151P and UI 157 provide a similar function and capability as discussed previously with respect to on-board systems 151. Air quality sensors 153P may be any known type of air quality sensor for measuring air quality (e.g., measure TVOCs, PM 2.5, AQI, pollens, etc.). Air quality sensors 153P may be one or more air quality sensors 153P in probe cars 150P. In various embodiments, air quality sensors 153P are included in one of on-board systems 151P.

Figure 2:
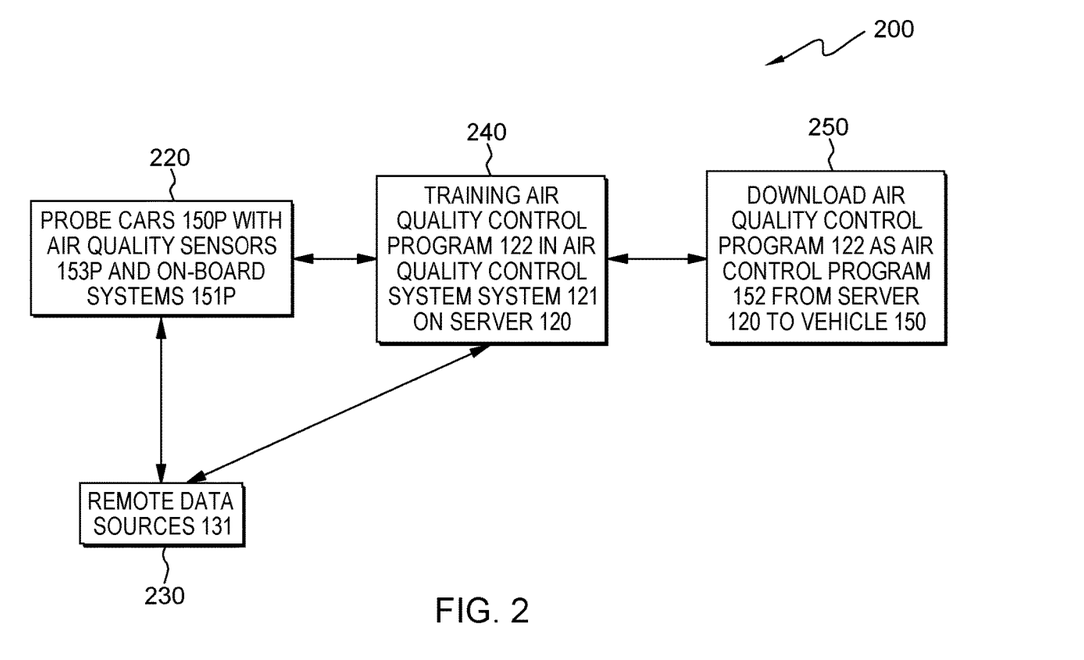
FIG. 2 is a block diagram illustrating an example of training an air quality control program in an air quality control system on a server, in accordance with at least one embodiment of the present invention.

FIG. 2 is a block diagram 200 illustrating an example of training air quality control program 122, in accordance with at least one embodiment of the present invention. As depicted, FIG. 2 includes block 220 representing probe cars 150P with air quality sensors 153P and on-board systems 151P, block 230 representing remote data sources 131 sending and receiving data related to in-vehicle air quality wirelessly to and from probe car on-board systems 151P that is used in block 240 to train air quality control program 122 in air quality control system 121 on server 120, and block 250 representing downloading air quality control program 122 as air control program 152 from server 120 to vehicle 150. The arrows in FIG. 2 represent the transmission of data related to in-vehicle air quality such as in-vehicle air quality measurements for probe cars 150P, weather conditions, and one or more actions by probe cars 150P on-board systems 151P between blocks 220, 230, and 240.

Block 220 represents a number of probe cars 150P with air quality sensors 153P and on-board systems 151P. Probe cars 150P include UI 157 capable of receiving user inputs and communicating with one or more programs such as air quality control program 122 on server 120. Probe cars 150P are deployed in a range of locations. Air quality sensors 153P in probe cars 150P measure and record in-vehicle air quality levels in probe cars 150P sent to server 120. In some embodiments, air quality sensors 153P measure in-vehicle and exterior vehicle air quality (e.g., air quality outside of probe cars 150P) communicated to server 120. Examples of air quality measurements recorded by probe car sensors include: various measurements of air quality such as atmospheric particulate matter (e.g., particulate matter less than 2.5 μm in diameter or PM 2.5, particulate matter 2.5-10 μm in diameter or PM 10), TVOCs, AQI, measurements of various elements such as pollens, ozone, $CO_2$, or any other known air quality measurements that may be collected by air quality sensors 153P in probe cars 150P. In various embodiments, air quality sensors 153P in probe cars 150P are included in a sensor system or an air quality sensor on-board system 151P capable of communicating with air quality control program 122 on server 120 (e.g., sending, receiving, and storing data such as probe car air quality data, receiving queries, etc.).

Probe car on-board systems 151P, similar to on-board systems 151 previously discussed with respect to vehicle 150, include one or more of: navigation systems, HVAC system, power window system, and various ADAS such as automatic cruise control (e.g., maintaining pre-set space from an car immediately in front of probe cars 150P), lane control, rain detection, crosswind stabilization, wireless communication systems (e.g., V2V and V2X), and the like that determine and collect data related to in-vehicle air quality. Data related to in-vehicle air quality collected by on-board systems 151P in probe cars 150P sent to air quality control program 122 includes but is not limited to: identification of surrounding or nearby vehicles (e.g., heavy construction vehicles or busses that emit high levels of exhaust captured on digital cameras in lane change or cruise control ADAS), weather conditions such as temperature, wind and rain, wirelessly collected data from nearby vehicles or roadside stations (e.g., as local air quality data from local air quality monitoring stations), and the like. For example, probe car on-board systems 151P retrieve from other nearby vehicles (e.g., within a quarter mile) information or data on a location of diesel trucks, busses, or construction equipment that emit large amounts of exhaust in the vicinity or in front of probe cars 150P.

In various embodiments, air quality control program 122 queries or retrieves data from probe car on-board systems 151P and air quality sensors 153P (e.g., on-board system 151P associated with air quality sensors 153P) for data related to in-vehicle air quality on a pre-determined interval such as every ten minutes during training. In an embodiment, probe car on-board systems 151P send recorded probe car air quality data (e.g., probe in-vehicle air quality data or probe car in-vehicle and exterior air quality data) and data related to in-vehicle air quality collected by on-board systems 151P to air quality control program 122 in server 120 on a pre-determined interval. For example, HVAC system, power window system, navigation system, ADAS, and air quality sensor on-board system send collected data every ten minutes after driver entry into a probe car (e.g., driver entry determined by door or driver seat sensors).

The number of probe cars 150P deployed in a location may be constant or may vary by location, population of a city, and over time (e.g., as probe cars 150P are driven to new locations or cities). For example, one to several hundred probe cars 150P may be deployed in a city, a town, a village, a rural area, or the like. Probe cars 150P may be deployed in a location, or preferably, to numerous locations (e.g., numerous cities, towns, suburbs, and rural areas). Probe car on-board systems 151P and air quality sensors 153P collect data related to in-vehicle air over a period of time (e.g., over several months, over one or more years, over various seasons, etc.). In some embodiments, probe cars 150P are deployed indefinitely or for as long as probe cars 150P are functional or being driven to collect and send in-vehicle air quality related data (e.g., location, weather, etc.) to server 120.

In some embodiments, on-board systems 151P and air quality sensors 153P within probe cars 150P receive, retrieve, and send data related to in-vehicle air quality to server 120 with an indication of the time the data is recorded. For example, data related to in-vehicle air quality collected and sent to air quality control program 122 on server 120 by on-board systems 151P or air quality sensors 153P include a timestamp, a data code, or a range of time for data collection such as from 1 to 3 pm on Jun. 6, 2017. For example, on-board systems 151P in probe cars 150P send data related to in-vehicle air quality on pre-set time intervals such as every hour, at a pre-set time such as at midnight, or when events recorded occur such as dust storm at 10:05 am. In various embodiments, air quality control program 122 receives notifications from on-board systems 151P of changes to one of on-board systems 151P such as a user or driver closing power windows or turning on air conditioning with re-circulating air. For example, on-board systems 151P send notifications of changes to one or more of on-boards systems 151P to air quality control program 122 on one of a pre-determined time interval or when the changes to on-board systems 151 occur.

Block 230 represents remote data sources 131 (depicted on servers 130A-N in FIG. 1). Remote data sources 131 may include websites, databases, programs, applications, and the like hosted by one or more computing devices or servers 130A-N as previously discussed with respect to FIG. 1. When queried by one or more of probe car on-board systems 151P or air quality control program 122, remote data sources 131 provide available requested data related in in-vehicle air quality to probe car on-board systems 151P or air quality control program 122 (e.g. provide air quality measurements for a location of probe cars 150P from NOAA). Additionally, remote data sources 131 may wirelessly receive and store data such as probe car exterior vehicle air quality sensor data, location, traffic, outside temperatures, and the like from various probe car on-board systems 151P.

Block 240 represents an example of training air quality control program 122 in air quality control system 121 on server 120. Training of air quality control program 122 in a cognitive or knowledge-based system such as air quality control system 121 includes collecting from one or more on-board systems 151P in probe cars 150P data related to in-vehicle air quality by time or by time interval recorded. For example, on-board system 151P such as a navigation system in the probe cars 150P retrieves map information such as probe car location, traffic conditions, nearby construction activity in the vicinity of probe cars 150P, nearby industrial areas, weather conditions in the vicinity of probe cars 150P, and the like from remote data sources 131 (e.g., local or national weather service websites, department of transportation website, etc.).

Based, at least in part, on an evaluation and analysis of a plurality of probe car data related to in-vehicle air quality from the probe cars on-board systems 151P, air quality control program 122 learns or is trained to associate various conditions or situations with various in-vehicle air quality levels and/or changes to in-vehicle air quality level (e.g., using in-vehicle air quality data from each probe car). For example, air quality control program 122 analyzes collected probe car 150P data for in-vehicle air quality when probe cars 150P are following a heavy dump truck and determines following a heavy dump truck correlates to a 20% increase in airborne particulate matter and a 5% increase in TVOCs. Further evaluation of the in-vehicle air quality during training of air quality control program 122 determines when probe cars are following a heavy dump truck for five minutes, the recorded a probe car in-vehicle air quality level that exceeds (e.g., is above) an allowable pre-set air quality level.

Analyzing collected probe car data related to in-vehicle air quality (e.g., nearby vehicles, traffic conditions, HVAC system status, in-vehicle air quality data, etc.) and the effects of one or more actions by on-board systems 151P on probe cars 150P in-vehicle air quality using statistical methods and machine learning algorithms during training, air quality control program 122 determines instructions for actions for one or more probe car on-board systems 151P such as increasing ventilation system fan speed, switching air circulation mode, closing windows or turning on air conditioning to maintain an in-vehicle air quality level that is at or below a pre-set in-vehicle air quality level. For example, a red light indicator in a probe car of probe cars 150P dashboard may indicate to a driver of a probe car an in-vehicle air quality level that is too low or poor (e.g., too much particulate matter and/or TVOCs in the probe car) and in response, the driver of the probe car (e.g., one of probe cars 150P) closes the probe car windows. Air quality control program 122 records the indication of the poor in-vehicle air quality level, the action of one of on-board systems 151P such as closing power windows, and the change in the in-vehicle air quality level associated with the action of closing power windows (e.g., an action by one of a probe cars 150P on-board systems 151P).

In various embodiments, during training of air quality control program 122, air quality control program 122 learns or determines which situations and factors from received data related to in-vehicle air quality collected by on-board systems 151P affects in-vehicle air quality measurements in probe cars 150P. Additionally, air quality program 122 learns how situations and factors (e.g., following a large truck) impact in-vehicle air quality levels. Based on analysis of data related to in-vehicle air quality collected during training, air quality control program 122 learns situations and factors expected to cause in-vehicle air quality levels to go above a pre-set air quality level. Air quality control program 122 correlates and analyzes received in-vehicle air quality measurements and data related to in-vehicle air quality including actions by one or more on-board systems 151P in probe cars 150P in order to learn situations and factors and actions by on-board systems 151P affecting in-vehicle air quality.

Based, at least in part, on an evaluation and analysis of a plurality of probe car data related to in-vehicle air quality received from the probe cars on-board systems 151P, air quality control program 122 learns or is trained to associate various factors or situations with various in-vehicle air quality levels and/or changes to in-vehicle air quality level (e.g., from measured in-vehicle air quality data from each of probe cars 150P). Continuing with the previous example, air quality control program 122 analyzes collected probe car data for in-vehicle air quality when probe cars 150P are following a heavy dump truck and determines following a heavy dump truck correlates to a 20% increase in airborne particulate matter and a 5% increase in TVOCs. Upon further evaluation of the data related to in-vehicle air quality collected by probe cars 150 during training, air quality control program 122 determines when probe cars 150P follow a heavy dump truck for five minutes or more the measured probe car in-vehicle air quality level when a window is open is above the pre-set air quality level. In response to determining the in-vehicle air quality level is above the pre-set air quality level, air quality control program 122 determines that an occurrence of this situation (e.g., following a dump truck for more than five minutes with an open window) requires an indication to close the window be provided to the probe car following the truck. The indication to close the window can be an indication to close probe car windows displayed on UI 157 or an instruction to an on-board system of on-board systems 151P of the probe car 150P following the truck to close the windows.

Using data correlation, data analysis by statistical methods, and machine learning algorithms on collected data related to in-vehicle air quality during training, air quality control program 122 determines instructions for one or more actions by on-board systems 151P for various factors and situations related to in-vehicle air quality used to keep measured in-vehicle air quality levels within allowable or pre-set in-vehicle air quality levels. For example, air quality control program 122 based, on training using data related to in-vehicle air quality collected by probe cars, learns situations and factors where an in-vehicle air quality level is predicted to be above an allowable or pre-set air quality level for the vehicle. In an embodiment, to verify or complete training, air quality control program 122 sends instructions for actions to one or more of on-board systems 151P and monitors in-vehicle air quality measurements from probe cars 150P that receive and execute the instructions to verify air quality control program 122 maintains the pre-set in-vehicle air quality. In some embodiments, air quality control program 122 during training verification, fine-tunes or refines instructions for one or more actions by on-board systems 151P to improve the effectiveness of air quality control program 122 in maintaining a pre-set in-vehicle air quality level.

In various embodiments, air quality control program 122 receives from a user on UI 127 on server 120 or UI 157 in probe cars 157 an allowable in-vehicle air quality level (e.g., a government agency determined air quality level) designated as a pre-set in-vehicle air quality level. In one embodiment, as a part of the training process, air quality control program 122 receives inputs from UI 157 in one of probe cars 150P a notification of a special health requirement that requires a user specified in-vehicle air quality level for a user in one of probe cars 150P. For example, a passenger in one of probe cars 150P has severe asthma triggered by large, air borne particulate matter. In response to receiving a notification of a vehicle passenger with a special identified health requirements such as asthma triggered by large airborne particulate matter, air quality control program 122 sets a user specified target or user specified pre-set air quality level for the one of probe cars 150P sending a notification of a special health requirement to a lower level for large particulate matter (e.g., reduce the in-vehicle level for large particulate matter by thirty percent). In this example, air quality control program 122 replaces a pre-set in-vehicle air quality level with a received user specified pre-set air quality level that is thirty percent lower for large particulate matter.

In one embodiment, air quality control program 122 receives inputs from a user interface in probe cars 150P such as a notification of a number of smokers in the probe car. In another example, air quality control program 122 receives from UI 157 in one or more of probe cars 150P a user provided indication of a smoker in the probe car. Air quality control program 122, as a part of the training process, retrieves and analyzes data from multiple probe cars 150P with smokers and determines (e.g., "learns") that probe cars 150P with one or more smokers require fresh or outside air intake within three minutes of start of a user smoking in probe cars 150P to maintain a pre-determined in-vehicle air quality level. Therefore, air quality control program 122 learns or determines that an instruction for an action by on-board systems 151P to provide fresh air intake in the ventilation system of the air conditioning system in three minutes (e.g., stop using re-circulated air) should be sent to the probe car indicating the presence of a smoker.

In an embodiment, when a city, town, or region without probe cars 150P is identified, air quality control program 122 is trained to correlate the identified city, town, or region with one or more cities, towns, or regions with similar attributes. Examples of similar attributes include similar population, similar industrial areas, similar geography (e.g., near an ocean or mountain range), and/or other similar attributes of locations such as cities that effect in-vehicle air quality. In an embodiment, air quality control program 122 based at least in part, on an analysis of similar city, town, or region attributes, provides instructions for actions for one or more on-board systems 151P in probe cars 150P in the identified city, town, or region without probe cars 150P based on the results of training air quality control program 122 in the similar city, town, or region with probe cars. For example, a city ABC without probe cars 150P near an ocean with a similar population as city XYZ with fifty probe cars 150P is determined by air quality control program 122 as a similar city to city XYZ and therefore, the results analysis of probe car data from the fifty probe cars 150P (e.g., instructions for actions by on-board systems 151P) in city XYZ are applied or sent to vehicles 150 in city ABC without probe cars 150P.

In another embodiment, air quality control program 122 receives from on-board systems 151P information on a probe car make, model, type of vehicle (e.g., mini-van), and year and determines similar vehicles 150 (e.g., based on vehicle 150 make, model, type, and year received from on-board systems 151). In an embodiment, air quality control program 122 associates instructions for one or more actions by on-board systems 151 in response to received data related to in-vehicle air quality to instructions for one or more actions by on-board systems 151P in a similar vehicle (e.g., one or more of a similar vehicle make, model, type, and/or year).

In various embodiments, training or evolution of air quality control program 122 continues over time as additional probe car data is received or retrieved from probe car on-board systems 151P and/or probe car air quality sensors 153P. Based, at least in part, on new received probe car data, air quality control program 122 updates, making new inferences and determined actions for previous and new recognized factors, situations, seasons, cities, towns and the like.

Block 250 represents downloading air quality control program 122 as air control program 152 from server 120 to vehicle 150. In various embodiments, air quality control program 122 is downloaded to vehicle 150 as air control program 152 in response to a user input on UI 127 or another UI (not depicted in FIG. 1). For example, when a user determines that training of air quality control program 122 in air quality control system 121 on server 120 is adequate or is complete, the user on UI 127 or other UI initiates a download of air quality control program 122 to an on-board system 151 for air quality control in vehicle 150. In various embodiments, air control program 152 (e.g., air quality control program 122 downloaded to vehicle 150) provides instructions for actions to on-board systems 151 in vehicle 150 to maintain a pre-set in-vehicle air quality level. For example, air control program 152 provides instructions to one or more of on-board systems 151 (e.g., the HVAC system or to the power window system) in response to situations and factors determined from the data related to in-vehicle air quality collected by one or more on-board systems 151 in vehicle 150 without an in-vehicle air quality sensor in order to maintain a pre-set in-vehicle air quality level. The determination of instructions for one or more actions for one or more on-board systems 151 is based, at least in part, on the training of air quality control program 122.

In various embodiments, air control program 152 is included on one or more microprocessors, microcontrollers, in an embedded system, or in an on-board system 151. For example, air control program 152 is an on-board air control system or is a part of an on-board system 151 such as an HVAC system in vehicle 150. In some embodiments, air quality control system 121 is downloaded as a system or an on-board system 151 for air control in vehicle 150. For example, the downloaded system includes air quality control program 122 downloaded as air control program 152 and storage 125 downloaded to storage or a database in the on-board system for air control in vehicle 150 (not depicted in FIG. 1).

In various embodiments, air quality control system 121 continues to evolve and update based at least in part, on new or additional probe car data. In various embodiments, in block 250, when air quality control program 122 in server 120 is updated with new inferences or actions for on-board systems 151 based, at least in part, on new or additional probe car data, and using wireless communication, air quality control program 122 automatically synchronizes with air control program 152 in vehicle 150.

In an embodiment, air quality control program 122 sends updates to air control program 152 on a pre-determined interval or time period (e.g., every week or month). In one embodiment, updates to air control program 152 in vehicle 150 occur via a wired connection from a computing device or computer at a dealer or service center when the dealer or service center receives updates to air quality control program 122 from server 120 upon vehicle 150 service at a dealer or service station.

In an alternative embodiment, a download of air quality control program 122 or block 250 does not occur. In this embodiment, air control program 152 in vehicle 150 collects data related to in-vehicle air quality from on-board systems 151 and sends the collected data to server 120, and in response, receives instructions for one or more actions by on-board systems 151 in vehicle 150 from air quality control program 122 on server 120.

Figure 3:
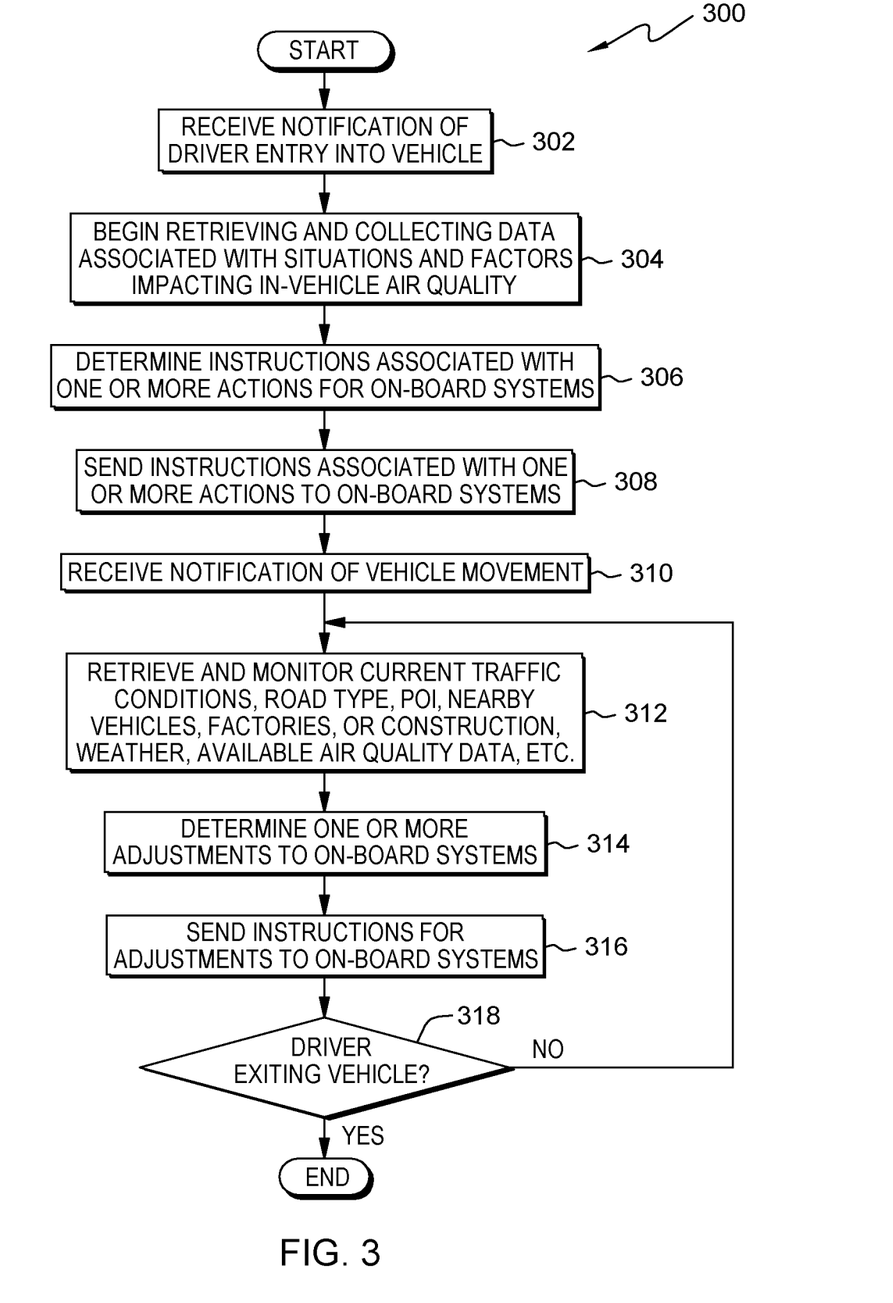
FIG. 3 is a flow chart depicting operational steps of an air control program, in a vehicle within the distributed data processing environment for controlling in-vehicle air quality, in accordance with at least one embodiment of the present invention.

FIG. 3 is a flow chart 300 depicting operational steps of air control program 152 in a vehicle 150 within the distributed data processing environment 100 for controlling in-vehicle air quality, in accordance with at least one embodiment of the present invention. In various embodiments, the operational steps of air quality program 152 occur after a trained air quality control program 122 is downloaded from server 120 as air control program 152 in vehicle 150.

Air control program 152 receives notification of driver entry into vehicle 150 (302). In various embodiments, air control program 152 receives an indication that the driver's door is open from one or more door sensors or from an on-board system of on-board systems 151 that controls power locks and/or door sensors. In an embodiment, air control program 152 receives a notification of driver entry into the vehicle identifying that a driver is sitting on the driver's seat from one or more seat sensors or an on-board system associated with one or more seat sensors (e.g., by weight or seat displacement).

Upon receiving a notification of driver entry into vehicle 150, air control program 152 begins retrieving and collecting data associated with situations and factors affecting in-vehicle air quality (304). Retrieving and collecting data related to in-vehicle air quality to identify situations and factors affecting in-vehicle air quality is discussed previously with respect to blocks 220, 230, and 240 in FIG. 2. For example, data related to in-vehicle air quality retrieved and collected from on-board systems 151 includes vehicle 150 location data, interior/exterior vehicle 150 temperatures, air quality in current or nearby location if available from remote data sources 131, HVAC system status, and the like. In an embodiment, collecting data by air control program 152 includes collecting received user inputs such as passenger smoking from UI 157.

Air control program 152 determines instructions associated with or more actions for on-board systems 151 (306) in vehicle 150. In various embodiments, air control program 152 determines one or more actions for on-board systems 151 such as HVAC system and power window system in vehicle 150 based, at least in part, on the collected and retrieved data related to in-vehicle air quality. For example, air control program 152 determines an action such as opening power windows when air control program 152 determines that TVOC levels have most likely risen above a pre-set level after two hours without being opened (e.g., based training data indicating that closed windows at a current temperature and a current closed window time interval result in a level of TVOC's above pre-set in-vehicle air quality level).

Air control program 152 determines instruction(s) for one or more actions for on-board systems 151 based, at least in part, training of air quality control program 122 on server 120 that has been downloaded as air control program 152 in vehicle 150 (e.g., as discussed in detail previously with respect to blocks 220, 240, and 250 in FIG. 2). In another example, air control program 152 retrieves and receives data such as inside vehicle temperature, outside temperature, ventilation fan speed, length of time with power windows closed with re-circulating air, and determines when ventilation system in HVAC system should begin intake of outside air (e.g., stop air re-circulation).

Air control program 152 sends instructions associated with one or more actions to on-board systems 151 (308). In various embodiments, air control program 152 sends commands or instructions for one or more actions to on-board systems 151 such as HVAC system and power window system. Continuing with the above example, air control program 152 sends instructions or a command for an action such as opening power windows to power window system in vehicle 150 based, at least in part, on the evaluation of data related to in-vehicle air quality such as inside vehicle temperature, outside temperature, ventilation fan speed, and length of time with power windows closed with re-circulating air. Air control program 152 may send instructions for actions to one or more on-board systems 151.

In an alternative embodiment, when air control program 152 is not a program downloaded from server 120, air quality control program 122 on server 120 determines instructions for one or more adjustments to on-board systems 151 based, at least in part, on data related to in-vehicle air quality received from air control program 152 in vehicle 150. In the alternative embodiment, air control program 152 sends the collected data related to in-vehicle air quality to air quality control program 122 on server 120 using a wireless communication network (e.g., network 110). Air quality control program 122 receives the data related to in-vehicle air quality and determines instructions for one or more actions (e.g., for vehicle 150 on-board systems 151) based, at least in part, on previously recognized situations and learned factors impacting in-vehicle air quality that are predicted to cause in-vehicle air quality to go above or exceed the pre-set in-vehicle air quality level (e.g., learned from training air quality control program 122 using probe car data as previously discussed with respect to block 240 in FIG. 2). Responsive to determining instructions for one or more actions, air quality control program 122 wirelessly transmits instructions for the determined one or more actions to air control program 152 in vehicle 150. Upon receipt of the determined one or more actions, air control program 152 sends the instructions for the one or more actions to the respective on-board systems 151 to execute the determined actions. For example, air control program 152 sends to server 120 a notification of a large construction vehicle directly in front of vehicle 150, and in response to receiving the notification, air quality control program 122 determines all power windows should be closed. Air quality control program 122 wirelessly transmits instructions to close all power windows to air control program 152 in vehicle 150, and in response, air control program 152 sends instructions to the power window system to close all power windows.

Air control program 152 receives a notification of vehicle 150 movement (310). A notification of vehicle 150 movement may be received from one or more on-board systems 151. For example, air control program 152 receives a notification or indication of movement from one or more of an engine control system, a navigation system, or another similar on-board system of on-board systems 151 capable of detecting vehicle 150 movement and sending a notification to air control program 152.

Air control program 152 retrieves and monitors current traffic conditions, road type, points of interest, weather, available air quality data, nearby vehicles, factories, and construction, and the like (312) that affect in-vehicle air quality. Air control program 152 retrieves data related to in-vehicle air quality from on-board systems 151. As previously discussed with respect to blocks 220, 230, and 240 in FIG. 2 and in step 304, air control program 152 retrieves data related to in-vehicle air quality for identification of factors and situations that impact in-vehicle air quality such as a large nearby tractor trailer, current traffic conditions such as a traffic jam, road type (e.g., highway, rural two lane road, city street, etc.), an open window, points of interest such as oceans, tunnels, and power plants, factories, and construction and the like from on-board systems 151.

In various embodiments, air control program 152 retrieves data related to in-vehicle air quality on a pre-determined schedule (e.g., by time such as every five minutes or by distance traveled) for an identification of factors and situations affecting in-vehicle air quality. In an embodiment, on-board systems 151 provide notifications to air control program 152 when a significant change in data related to in-vehicle air quality such as entry into a tunnel, stopping in heavy traffic due to a sudden traffic jam, and the like is detected. In various embodiments, air control program 152 continues with data collection and retrieval from on-board systems 151 and remote data sources 131 until receipt of notification of the driver exiting or leaving vehicle 150 (e.g., received from door sensors, door on-board system, seat sensors, or driver seating detection on-board system).

Air control program 152 determines one or more adjustments to on-board systems 151 (314) such as HVAC and/or power window system adjustments based, at least in part, on data related to in-vehicle air quality collected by on-board systems 151. In various embodiments, air control program 152 determines adjustments to one or more on-board systems 151 such as increasing ventilation fan speed or opening power windows based, at least in part, on current traffic conditions, weather, nearby vehicles, and the like as previously discussed with respect to step 306 and blocks 220, 230, and 240 in FIG. 2.

Air control program 152 sends instructions for adjustments to on-board systems 151 (316). As previously discussed with respect to step 308, in various embodiments, air control program 152 sends commands or instructions for one or more actions or adjustments to on-board systems such as HVAC system and power window system. For example, after leaving a highway adjacent to an industrial zone and entering a rural, two lane road with little traffic, air control program 152 sends instructions to the HVAC system to open external air intake (e.g., run heating system using fresh, non-re-circulated air).

Air control program 152 determines whether a driver is exiting vehicle 150 (decision 318). Responsive to a received notification from at least one of: door sensors, an on-board system (e.g., one of on-board systems 151) controlling power locks and/or door sensors indicating that the driver's door is open, from seat sensors or an on-board system identifying that a driver is not sitting on the driver's seat (yes branch, decision 318), air control program 152 determines that the driver is exiting vehicle 150, and air control program 152 ends.

However, responsive to air control program not receiving a notification that the driver is exiting vehicle 150 (no branch, decision 318), air control program 152 returns to step 312 to continue retrieving and monitoring data related to in-vehicle air quality such as current traffic conditions, road type, points of interest, nearby vehicles, and the like.

Figure 4:
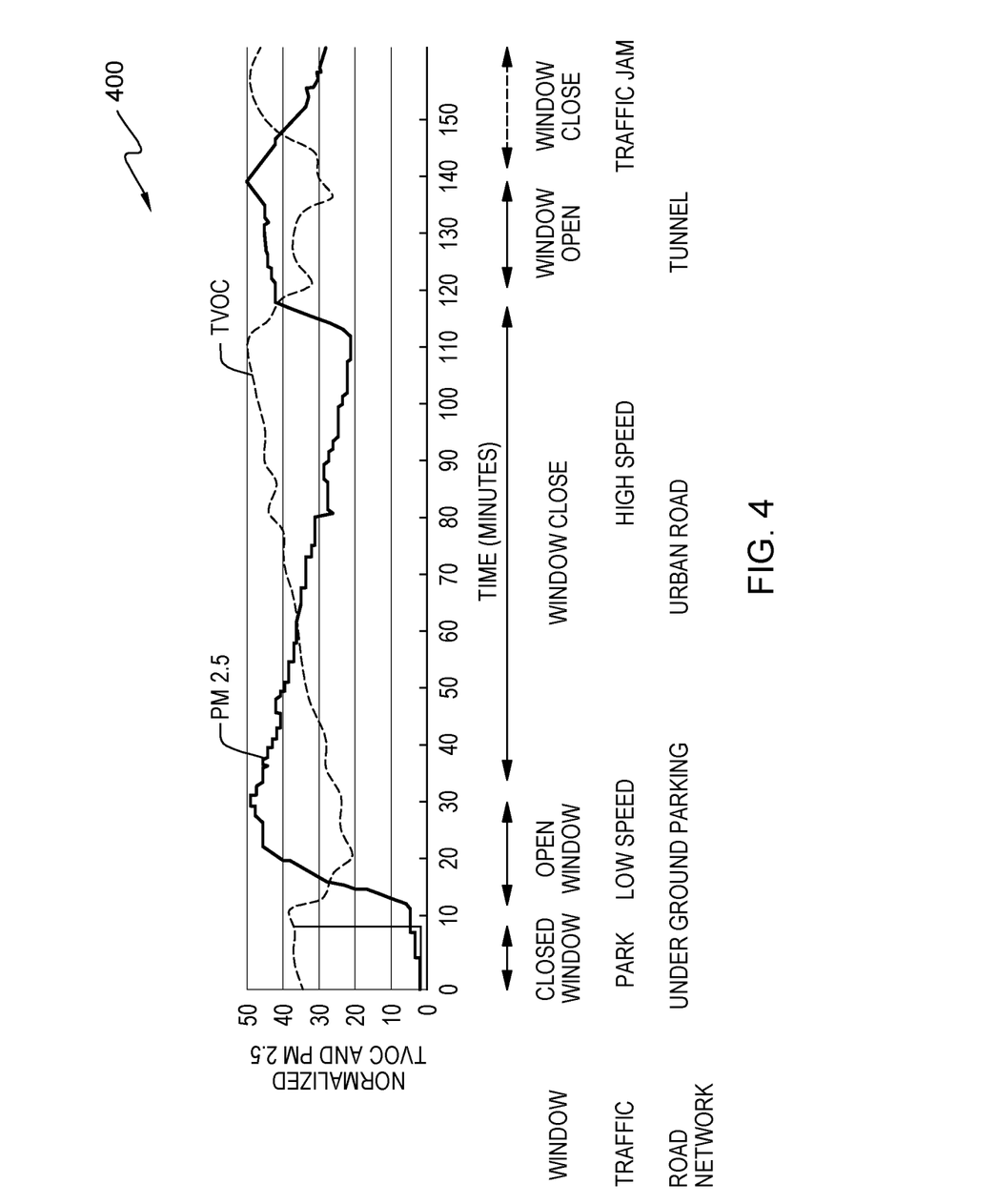
FIG. 4 is a graph illustrating an example of data collected by a probe car, in accordance with at least one embodiment of the present invention.

FIG. 4 is a graph 400 illustrating an example of data collected by a probe car, in accordance with at least one embodiment of the present invention. As depicted, FIG. 4 includes an example of measurements of TVOCs and PM 2.5 μm from an in-vehicle air quality sensor in a probe car over time. The measurements are recorded as normalized TVOC and PM 2.5 μm (e.g., a normalized scale based unitless numbers correlating levels of TVOC and PM 2.5 μm) on a scale of zero to fifty versus time (e.g., in minutes). Recorded below the graph is an example of a partial listing or recording of situations and factors affecting in-vehicle air quality.

In an embodiment, air quality control program 122 includes a pre-determined level of TVOCs and/or PM 2.5 μm that is either received from a user on UI 127, retrieved from a website or database (e.g., environmental protection agency (EPA)) or received from a user on a UI in another computing device that is used as a threshold in-vehicle air quality level to train air quality control program 122 (e.g., as previously discussed, in reference to block 240 in FIG. 2). Based, at least in part, on the received threshold level of TVOC or PM 2.5 μm, air quality control program 122 determines instructions for one or more actions needed to maintain the pre-determined in-vehicle air quality. For example, as depicted in FIG. 4, a pre-set normalized air quality level of 50 requires an action such as closing a window, as determined by air quality control program 122 during program training to maintain air quality levels (e.g., keep TVOCs and PM 2.5 μm below pre-determined level of 50).

Figure 5:
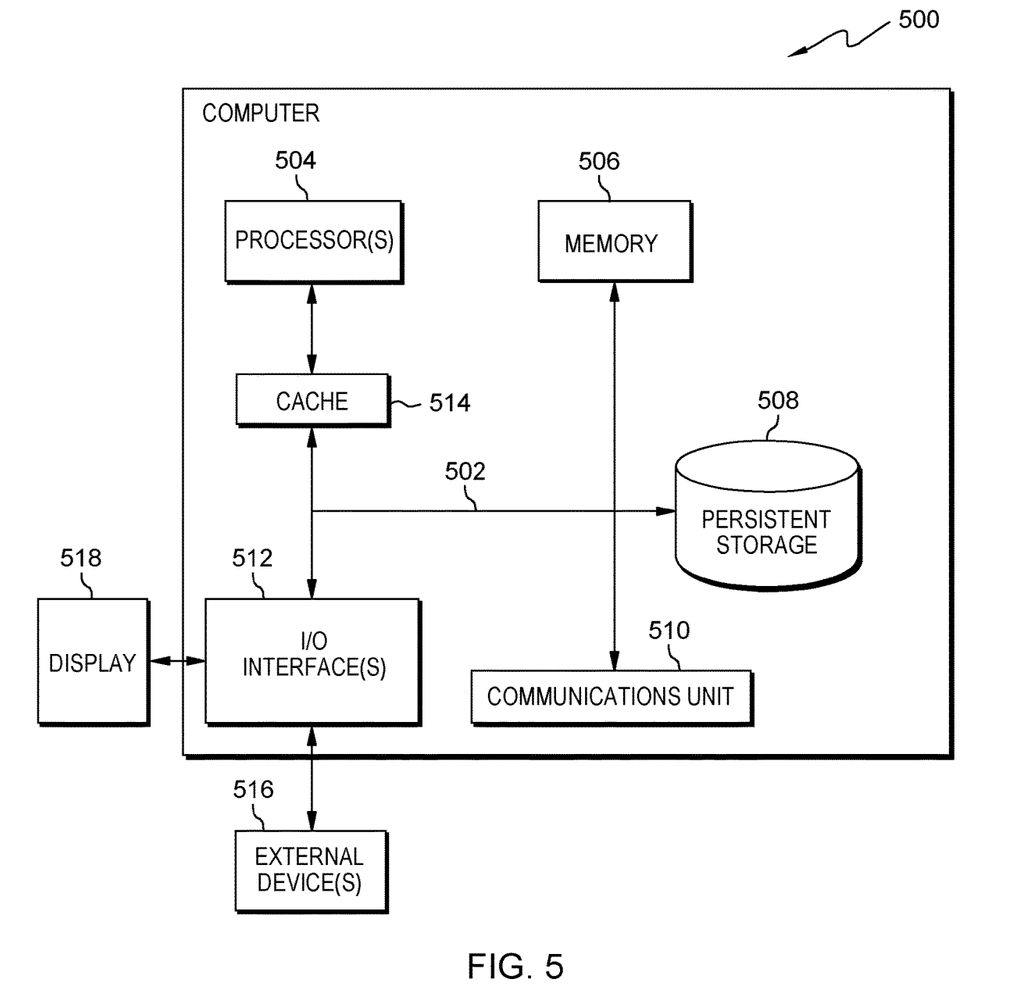
FIG. 5 is a block diagram depicting components of a computer system in a distributed data processing environment, in accordance with at least one embodiment of the present invention.

FIG. 5 depicts a block diagram 500 of components of a computer system, which is an example of a system such as server 120 and servers 130A-N within distributed data processing environment 100, in accordance with an embodiment of the present invention. It should be appreciated that FIG. 5 provides only an illustration of one implementation and does not imply any limitations, with regard to the environments in which different embodiments can be implemented. Many modifications to the depicted environment can be made.

Server 120 and servers 130A-N each can include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data and near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices, including resources of server 120 and servers 130A-N, vehicle 150, probe cars 150P, and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 120 and servers 130A-N. For example, I/O interface(s) 512 may provide a connection to external device(s) 516 such as a keyboard, a keypad, a touch screen, a microphone, a digital camera and/or some other suitable input device. External device(s) 516 can also include portable computer readable storage media, for example, devices such as thumb drives, portable optical or magnetic disks and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

What is claimed:

1. A method, the method comprising:

training, by one or more computer processors, a machine learning model for in-vehicle air quality control in a knowledge-based system using a plurality of probe cars with one or more air quality sensors monitoring a level of particulate matter and a level of total volatile organic compounds in each of the plurality of probe cars while collecting, by one or more on-board systems in the plurality of probe cars, a plurality of data including location data, temperature data, nearby vehicle data, traffic conditions data, weather data, heating ventilation and air conditioning (HVAC) system status, information on nearby factories and nearby construction as;

downloading, by one or more computer processors, the machine learning model for in-vehicle air quality control, after training of the machine learning model using the one or more air quality sensors in the plurality of probe cars and the location data, the temperature data, the nearby vehicle data, the traffic conditions data, the weather data, the HVAC system status, the information on nearby factories and the nearby construction collected by the one or more on-board systems is complete, to a computing device in a vehicle without an air quality sensor;

retrieving, by one or more computer processors, a plurality of data collected by one or more on-board systems in the vehicle without the air quality sensor;

determining, by one or more computer processors, that an occurrence of a situation of one or more situations when an in-vehicle air quality level is predicted to be above the pre-determined in-vehicle air quality level based, at least in part, on the plurality of data collected by the one or more on-board systems in the vehicle without the air quality sensor;

determining, by one or more computer processors, instructions for one or more actions by one or more of the one or more on-board systems in the vehicle without the air quality sensor to maintain the in-vehicle air quality level at or below the pre-determined in-vehicle air quality level based, at least in part, on the downloaded machine learning model; and sending, by one or more computer processors, the instructions for the one or more actions to one or more of the one or more on-board systems in the vehicle without the air quality sensor to maintain the in-vehicle air quality level at or below the pre-determined in-vehicle air quality level.

2. The method of claim 1, wherein collecting the plurality of data from one or more on-board systems in the vehicle occurs in response to receiving an indication of a driver entry into the vehicle.

3. The method of claim 1, wherein the pre-determined in-vehicle air quality level is a regulated in-vehicle air quality level that is simultaneously communicated to each of the plurality of probe cars and the vehicle without the air quality sensor-when a level of the pre-determined air quality is changed with a new regulation.

4. The method of claim 1, wherein the pre-determined in-vehicle air quality level is a user specified level of air quality received from a user input via a user interface of a probe car of the plurality of probe cars or from a user input via a user interface of the vehicle without the air quality sensor, wherein the user specified level of air quality is based, at least in part, on a special health requirement of a user of the probe car or a user of the vehicle without the air quality sensor, and wherein the user specified air quality level includes at least one of a pollen level, the level of in-vehicle particulate matter, or a level of total volatile organic compounds.

5. The method of claim 1, wherein collecting the plurality of data from the one or more on-board systems in the plurality of probe cars includes receiving from one or more probe cars of the plurality of probe cars an indication of one or more smokers in a vehicle from a user input via a user interface in the one or more probe cars of the plurality of probe cars.

6. The method of claim 1, wherein collecting the plurality of data from the plurality of probe cars includes collecting a plurality of data on an environment external to each of the plurality of probe cars and a plurality of data on an interior vehicle environment of each of the plurality of probe cars.

7. The method of claim 6, wherein the plurality of data on the external environment to each of the plurality of probe cars includes at least a probe car location, weather conditions at the probe car location, an identification of one or more vehicles nearby the probe car, traffic conditions at the probe car location, and map information associated with the probe car location.

8. The method of claim 1, further comprises:

maintaining, by one or more computer processors, the pre-determined in-vehicle air quality level in the vehicle without the air quality sensor, wherein the pre-determined in-vehicle air quality level is maintained based, at least in part, on the plurality of data collected by one or more on-board systems in the vehicle without the air quality sensor and the downloaded machine learning model for in-vehicle air quality control in the vehicle without the air quality sensor.

9. A computer program product comprising:

one or more computer readable storage media and program instructions stored on the one or more computer readable storage media, the program instructions executable by a processor, the program instructions comprising instructions to:

train a machine learning model for in-vehicle air quality control in a knowledge-based system using a plurality of probe cars with one or more air quality sensors monitoring a level of particulate matter and a level of total volatile organic compounds in each of the plurality of probe cars while collecting, by one or more on-board systems in the plurality of probe cars a plurality of data including location data, temperature data, nearby vehicle data, traffic conditions data, weather data, heating ventilation and air conditioning (HVAC) system status, information on nearby factories and nearby construction;

download the machine learning model for in-vehicle air quality control, after training of the machine learning model using the one or more air quality sensors in the plurality of probe cars and the location data, the temperature data, the nearby vehicle data, the traffic conditions data, the weather data, the HVAC system status, the information on nearby factories and the nearby construction collected by from the one or more on-board systems is complete, to a computing device in a vehicle without an air quality sensor;

retrieve a plurality of data collected by one or more on-board systems in the vehicle without the air quality sensor;

determine that an occurrence of a situation of one or more situations when an in-vehicle air quality level is predicted to be above the pre-determined in-vehicle air quality level based, at least in part, on the plurality of data collected by the one or more on-board systems in the vehicle without the air quality sensor;

determine instructions for one or more actions by one or more of the one or more on-board systems in the vehicle without the air quality sensor to maintain the in-vehicle air quality level at or below the pre-determined in-vehicle air quality level based, at least in part, on the downloaded machine learning model; and send the instructions for the one or more actions to one or more of the one or more on-board systems in the vehicle without the air quality sensor to maintain the in-vehicle air quality level at or below the pre-determined in-vehicle air quality level.

10. The computer program product of claim 9, wherein collecting the plurality of data from one or more on-board systems in the vehicle occurs in response to receiving an indication of a driver entry into the vehicle.

11. The computer program product of claim 9, wherein the pre-determined in-vehicle air quality level is a regulated in-vehicle air quality level that is simultaneously communicated to each of the plurality of probe cars and the vehicle without the air quality sensor-when a level of the pre-determined air quality is changed with a new regulation.

12. The computer program product of claim 9, wherein the pre-determined in-vehicle air quality level is a regulated in-vehicle air quality level that is simultaneously communicated to each of the plurality of probe cars and the vehicle without the air quality sensor when a level of the pre-determined air quality is changed with a new regulation.

13. The computer program product of claim 9, wherein the pre-determined in-vehicle air quality level is a user specified level of air quality received from a user input via a user interface of a probe car of the plurality of probe cars or from a user input via a user interface of the vehicle without the air quality sensor, wherein the user specified level of air quality is based, at least in part, on a special health requirement of a user of the probe car or a user of the vehicle without the air quality sensor, and wherein the user specified air quality level includes at least one of a pollen level, the level of in-vehicle particulate matter, or a level of total volatile organic compounds.

14. The computer program product of claim 9, wherein collecting the plurality of data from one or more on-board systems in the plurality of probe cars includes receiving from one or more probe cars of the plurality of probe cars an indication of one or more smokers in a vehicle from a user input via a user interface in the one or more probe cars of the plurality of probe cars.

15. A computer system comprising:
one or more computer processors;
one or more computer readable storage media; and
program instructions stored on the one or more computer readable storage media for execution by at least one of the one or more computer processors, the program instructions comprising instructions to:

train a machine learning model for in-vehicle air quality control in a knowledge-based system using a plurality of probe cars with one or more air quality sensors monitoring a level of particulate matter and a level of total volatile organic compounds in each of the plurality of probe cars while collecting, by one or more on-board systems in the plurality of probe cars, a plurality of data including location data, temperature data, nearby vehicle data, traffic conditions data, weather data, heating ventilation and air conditioning (HVAC) system status, information on nearby factories and nearby construction as;

download the machine learning model for in-vehicle air quality control, after training of the machine learning model using the one or more air quality sensors in the plurality of probe cars and the location data, the temperature data, the nearby vehicle data, the traffic conditions data, the weather data, the HVAC system status, the information on nearby factories and the nearby construction collected by the one or more on-board systems is complete, to a computing device in a vehicle without an air quality sensor;

retrieve a plurality of data collected by one or more on-board systems in the vehicle without the air quality sensor;

determine that an occurrence of a situation of one or more situations when an in-vehicle air quality level is predicted to be above the pre-determined in-vehicle air quality level based, at least in part, on the plurality of data collected by the one or more on-board systems in the vehicle without the air quality sensor;

determine instructions for one or more actions by one or more of the one or more on-board systems in the vehicle without the air quality sensor to maintain the in-vehicle air quality level at or below the pre-determined in-vehicle air quality level based, at least in part, on the downloaded machine learning model; and send the instructions for the one or more actions to one or more of the one or more on-board systems in the vehicle without the air quality sensor to maintain the in-vehicle air quality level at or below the pre-determined in-vehicle air quality level.

16. The computer system of claim 15, wherein the pre-determined in-vehicle air quality level is a regulated in-vehicle air quality level that is simultaneously communicated to each of the plurality of probe cars and the vehicle without the air quality sensor when a level of the pre-determined air quality is changed with a new regulation.

17. The computer system of claim 15, wherein collecting the plurality of data by one or more on-board systems in the plurality of probe cars includes at least a probe car location, weather conditions at the probe car location, an identification of one or more vehicles nearby the probe car, traffic conditions at the probe car location, and map information associated with the probe car location.

* * * * *